United States Patent
Le et al.

(10) Patent No.: US 10,636,439 B2
(45) Date of Patent: Apr. 28, 2020

(54) MAMR WRITE HEAD WITH THERMAL DISSIPATION CONDUCTIVE GUIDE

(71) Applicant: Western Digital Technologies, Inc., San Jose, CA (US)

(72) Inventors: Quang Le, San Jose, CA (US); Hongquan Jiang, San Jose, CA (US); Ning Shi, San Jose, CA (US); Alexander M. Zeltser, San Jose, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 16/276,508

(22) Filed: Feb. 14, 2019

(65) Prior Publication Data

US 2019/0259413 A1    Aug. 22, 2019

Related U.S. Application Data

(63) Continuation of application No. 16/146,139, filed on Sep. 28, 2018, now abandoned.
(Continued)

(51) Int. Cl.
*G11B 5/31* (2006.01)
*G11B 5/66* (2006.01)
(Continued)

(52) U.S. Cl.
CPC .......... *G11B 5/3133* (2013.01); *G11B 5/3116* (2013.01); *G11B 5/3146* (2013.01);
(Continued)

(58) Field of Classification Search
None
See application file for complete search history.

(56) References Cited

U.S. PATENT DOCUMENTS 5,966,273 A  *  10/1999  Matsumoto .............. G11B 5/40
                                                    360/320
6,252,749 B1     6/2001  Hayakawa
(Continued)

FOREIGN PATENT DOCUMENTS

| CN | 104835510 B | 11/2017 |
| JP | 2013251042 A | 12/2013 |
| WO | 2015126326 A1 | 8/2015 |

OTHER PUBLICATIONS

AZoM, "Aluminium Nitride / Aluminum Nitride (AlN)—Properties and Applications," AZO Materials, published Jul. 26, 2001; https://www.azom.com/article.aspx?ArticleID=610 (Year: 2001).*
(Continued)

*Primary Examiner* — William J Klimowicz
(74) *Attorney, Agent, or Firm* — Patterson & Sheridan, LLP; Steven H. Versteeg

(57) ABSTRACT

The present disclosure generally relates to data storage devices, and more specifically, to a magnetic media drive employing a magnetic recording head. The head includes a trailing shield, a main pole, a MAMR stack disposed between the trailing shield and the main pole, side shields surrounding at least a portion of the main pole, and a structure disposed between the side shields and the main pole at a media facing surface (WS). The structure is fabricated from a material that is thermally conductive and electrically insulating/dissipative. The material has a thermal conductivity of at least 50 W/(m*K) and an electrical resistivity of at least $10^5$ $\Omega$*m. The structure helps dissipate joule heating generated from either the main pole or the MAMR stack into surrounding area without electrical shunting, leading to reduced heating or break-down induced failures.

30 Claims, 6 Drawing Sheets

Related U.S. Application Data

(60) Provisional application No. 62/607,757, filed on Dec. 19, 2017.

(51) Int. Cl.
*G11B 5/73* (2006.01)
*G11B 5/00* (2006.01)

(52) U.S. Cl.
CPC .............. *G11B 5/66* (2013.01); *G11B 5/7368* (2019.05); *G11B 2005/0024* (2013.01)

(56) References Cited

U.S. PATENT DOCUMENTS

| | | | |
|---|---|---|---|
| 6,396,660 B1 | 5/2002 | Jensen et al. | |
| 6,950,280 B2 | 9/2005 | Rea et al. | |
| 8,325,442 B2 | 12/2012 | Koui et al. | |
| 8,582,240 B1 | 11/2013 | Chen et al. | |
| 8,861,137 B1* | 10/2014 | Lam | G11B 5/315 216/22 |
| 8,995,088 B1 | 3/2015 | Boone et al. | |
| 9,135,933 B2 | 9/2015 | Nunokawa et al. | |
| 9,230,571 B1 | 1/2016 | Chen et al. | |
| 9,275,672 B2 | 3/2016 | Shiroishi et al. | |
| 9,368,135 B2 | 6/2016 | Gao | |
| 9,508,364 B1* | 11/2016 | Tang | G11B 5/112 |
| 9,691,416 B1* | 6/2017 | Izawa | G06F 1/20 |
| 9,881,637 B1 | 1/2018 | Wilson et al. | |
| 10,121,497 B1 | 11/2018 | Takahashi et al. | |
| 10,147,446 B1* | 12/2018 | Wessel | G11B 5/3133 |
| 10,186,284 B2 | 1/2019 | Narita et al. | |
| 10,236,021 B2 | 3/2019 | Narita et al. | |
| 10,276,193 B2 | 4/2019 | Narita et al. | |
| 10,325,618 B1 | 6/2019 | Wu et al. | |
| 10,366,714 B1 | 7/2019 | Olson et al. | |
| 2003/0067717 A1 | 4/2003 | Garfunkel et al. | |
| 2004/0085675 A1 | 5/2004 | Cyrille et al. | |
| 2008/0291582 A1* | 11/2008 | Hirata | G11B 5/11 360/319 |
| 2008/0304176 A1 | 12/2008 | Takagishi et al. | |
| 2009/0059423 A1 | 3/2009 | Yamada et al. | |
| 2009/0310244 A1 | 12/2009 | Shimazawa et al. | |
| 2009/0316304 A1 | 12/2009 | Funayama et al. | |
| 2012/0113544 A1* | 5/2012 | Bonhote | G11B 5/1278 360/97.11 |
| 2012/0170156 A1 | 7/2012 | Sasaki et al. | |
| 2013/0057981 A1 | 3/2013 | Urakami et al. | |
| 2013/0063837 A1* | 3/2013 | Udo | G11B 5/1278 360/75 |
| 2013/0250456 A1 | 9/2013 | Yamada et al. | |
| 2013/0316088 A1* | 11/2013 | Fujita | G11B 5/84 427/526 |
| 2014/0139952 A1 | 5/2014 | Takeo et al. | |
| 2014/0177100 A1 | 6/2014 | Sugiyama et al. | |
| 2015/0206550 A1* | 7/2015 | Freitag | G11B 5/11 216/22 |
| 2016/0027455 A1 | 1/2016 | Kudo et al. | |
| 2017/0236537 A1 | 8/2017 | Murakami et al. | |
| 2018/0268848 A1 | 9/2018 | Narita et al. | |
| 2019/0088274 A1 | 3/2019 | Narita et al. | |

OTHER PUBLICATIONS

Mallary, Mike et al; "Head and Media Challenges for 3 Tb/in2 Microwave-Assisted Magnetic Recording"; IEEE Transactions on Magnetics, vol. 50, No. 7, Jul. 2014 (8 pages).

Tagawa et al. "Advantage of MAMR Read-Write Performance," IEEE Transactions on Magnetics, vol. 52, No. 9; http://www.ieee.org/publications_standards/publications/rights/index.html; Sep. 2016 (4 pages).

International Search Report and the Written Opinion of the International Application No. PCT/US2018/053223 dated Jan. 28, 2019, 15 pages.

Tagawa et al. "Advantage of MAMR Read-Write Performance," IEEE Transactions on Magnetics, vol. 52, No. 9, pp. 1-4, Sep. 2016, doi: 10.1109/TMAG.2016.2569524. (Abstract Only).

\* cited by examiner

MAMR WRITE HEAD WITH THERMAL DISSIPATION CONDUCTIVE GUIDE

CROSS-REFERENCE TO RELATED APPLICATIONS

This application is a continuation of U.S. patent application Ser. No. 16/146,139, filed Sep. 28, 2018, which claims benefit of U.S. Provisional Patent Application Ser. No. 62/607,757, filed Dec. 19, 2017. Each of the aforementioned related patent applications is herein incorporated by reference.

BACKGROUND

Field of the Disclosure

Embodiments of the present disclosure generally relate to data storage devices, and more specifically, to a magnetic media drive employing a magnetic recording head.

Description of the Related Art

Over the past few years, microwave assisted magnetic recording (MAMR) has been studied as a recording method to improve the areal density of a magnetic read/write device, such as a hard disk drive (HDD). MAMR enabled magnetic recording heads utilize a MAMR stack disposed between the trailing shield and the main pole to improve write field and/or field gradient, leading to better areal density capability (ADC). The MAMR stack may include a seed layer and at least one magnetic layer, such as a spin torque layer (STL) that is magnetized by a bias current from the main pole to the MAMR stack during operation. Alternatively, the MAMR stack may be a spin torque oscillator (STO) for generating a microwave (high frequency AC magnetic field). When a bias current is conducted to the STO from the main pole, the STO oscillates and provides an AC magnetic field to the recording medium. The AC magnetic field may reduce the coercive force of the recording medium, thus high quality recording by MAMR may be achieved.

However, Joule heating induced by the bias current from the main pole to the MAMR stack leads to heating or break-down induced failures. Conventionally, the MAMR stack and the main pole are surrounded by an electrically and thermally resistive material, such as aluminum oxide, which is very inefficient to dissipate heat.

Therefore, there is a need in the art for an improved data storage device.

SUMMARY OF THE DISCLOSURE

The present disclosure generally relates to data storage devices, and more specifically, to a magnetic media drive employing a magnetic recording head. The head includes a trailing shield, a main pole, a MAMR stack disposed between the trailing shield and the main pole, side shields surrounding at least a portion of the main pole, and a structure disposed between the side shields and the main pole at a media facing surface (MFS). The structure is fabricated from a material that is thermally conductive and electrically insulating/dissipative. The material has a thermal conductivity of at least 50 W/(m*K) and an electrical resistivity of at least $10^5$ Ω*m. The structure helps dissipate joule heating generated from either the main pole or the MAMR stack into surrounding area without electrical shunting, leading to reduced heating or break-down induced failures.

In one embodiment, the magnetic recording head includes a trailing shield, a main pole, a stack disposed between the main pole and the trailing shield, and a first structure surrounding at least a portion of the main pole at a media facing surface, wherein the first structure is fabricated from a material having a thermal conductivity of at least 50 W/(m*K) and an electrical resistivity of at least $10^5$ Ω*m.

In another embodiment, the magnetic recording head includes a trailing shield, a main pole, a stack disposed between the main pole and the trailing shield, and a first structure surrounding at least a portion of the main pole at a media facing surface, wherein the first structure is fabricated from a material selected from the group consisting of aluminum nitride, silicon carbide, beryllium oxide, gallium nitride, gallium phosphide, hexagonal boron nitride, cubic boron nitride, boron arsenide, gamma magnesium aluminate, zinc oxide, silicon, carbon, beryllium, tungsten, iridium, rhodium, molybdenum, diamond like carbon, and combination thereof.

In another embodiment, the magnetic recording head includes a trailing shield, a main pole, side shields surrounding at least a portion of the main pole, a stack disposed between the main pole and the trailing shield, and a first structure disposed between the trailing shield and the side shields, wherein the first structure includes at least one layer of gallium nitride, gallium phosphide, hexagonal boron nitride, cubic boron nitride, boron arsenide, gamma magnesium aluminate, silicon, carbon, beryllium, tungsten, iridium, rhodium, molybdenum, diamond like carbon, or zinc oxide, and at least one layer of aluminum oxide, aluminum nitride, or silicon carbide.

In another embodiment, the magnetic recording head includes a trailing shield, a main pole, a stack disposed between the main pole and the trailing shield, and means for dissipate heat generated from the main pole or the stack without electrical shunting, wherein the means for dissipate heat surrounds at least a portion of the main pole at a media facing surface.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

The present disclosure generally relates to data storage devices, and more specifically, to a magnetic media drive employing a magnetic recording head. The head includes a trailing shield, a main pole, a MAMR stack disposed between the trailing shield and the main pole, side shields surrounding at least a portion of the main pole, and a structure disposed between the side shields and the main pole at a MFS. The structure is fabricated from a material that is thermally conductive and electrically insulating/dissipative. The material has a thermal conductivity of at least 50 W/(m*K) and an electrical resistivity of at least $10^5$ $\Omega$*m. The structure helps dissipate joule heating generated from either the main pole or the MAMR stack into surrounding area without electrical shunting, leading to reduced heating or break-down induced failures.

The terms "over," "under," "between," and "on" as used herein refer to a relative position of one layer with respect to other layers. As such, for example, one layer disposed over or under another layer may be directly in contact with the other layer or may have one or more intervening layers. Moreover, one layer disposed between layers may be directly in contact with the two layers or may have one or more intervening layers. In contrast, a first layer "on" a second layer is in contact with the second layer. Additionally, the relative position of one layer with respect to other layers is provided assuming operations are performed relative to a substrate without consideration of the absolute orientation of the substrate.

Figure 1:
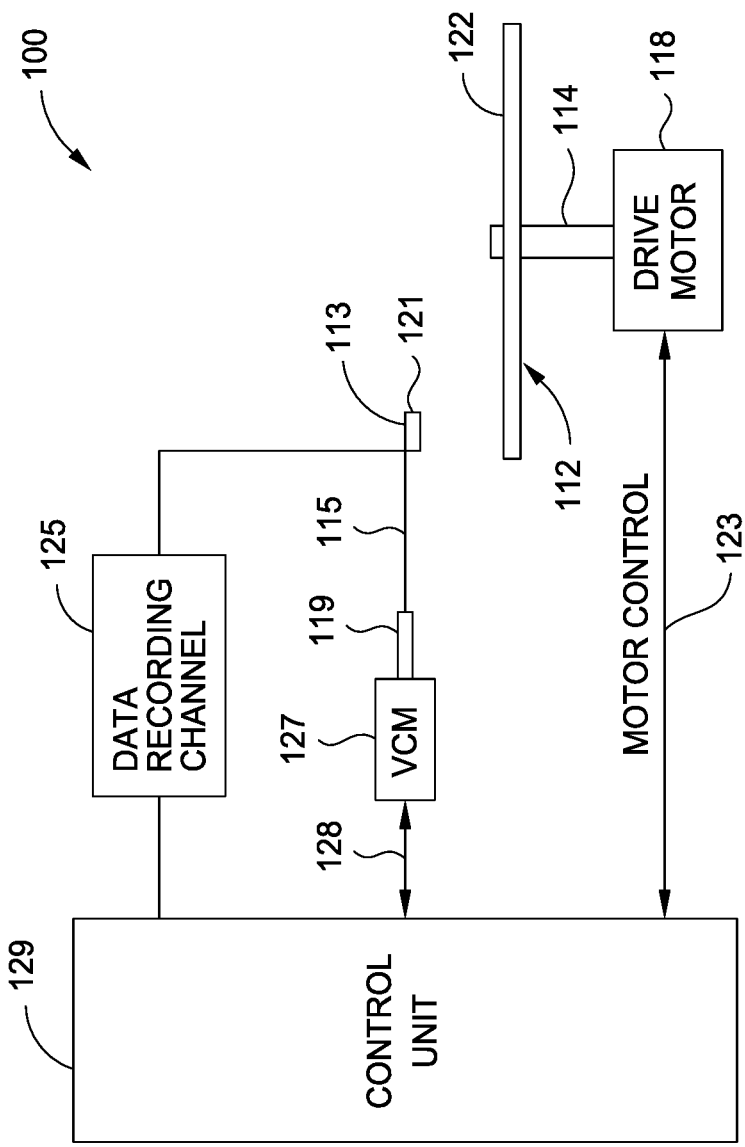
FIG. 1 is a schematic illustration of a magnetic media device according to one embodiment.

FIG. 1 is a schematic illustration of a data storage device such as a magnetic media device. Such a data storage device may be a single drive/device or comprise multiple drives/devices. For the sake of illustration, a single disk drive 100 is shown according to one embodiment. As shown, at least one rotatable magnetic disk 112 is supported on a spindle 114 and rotated by a drive motor 118. The magnetic recording on each magnetic disk 112 is in the form of any suitable pattern of data tracks, such as annular patterns of concentric data tracks (not shown) on the magnetic disk 112.

At least one slider 113 is positioned near the magnetic disk 112, each slider 113 supporting one or more magnetic head assemblies 121. As the magnetic disk 112 rotates, the slider 113 moves radially in and out over the disk surface 122 so that the magnetic head assembly 121 may access different tracks of the magnetic disk 112 where desired data are written. Each slider 113 is attached to an actuator arm 119 by way of a suspension 115. The suspension 115 provides a slight spring force which biases the slider 113 toward the disk surface 122. Each actuator arm 119 is attached to an actuator means 127. The actuator means 127 as shown in FIG. 1 may be a voice coil motor (VCM). The VCM includes a coil movable within a fixed magnetic field, the direction and speed of the coil movements being controlled by the motor current signals supplied by control unit 129.

During operation of the disk drive 100, the rotation of the magnetic disk 112 generates an air bearing between the slider 113 and the disk surface 122 which exerts an upward force or lift on the slider 113. The air bearing thus counterbalances the slight spring force of suspension 115 and supports slider 113 off and slightly above the disk surface 122 by a small, substantially constant spacing during normal operation.

The various components of the disk drive 100 are controlled in operation by control signals generated by control unit 129, such as access control signals and internal clock signals. Typically, the control unit 129 comprises logic control circuits, storage means and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Write and read signals are communicated to and from write and read heads on the assembly 121 by way of recording channel 125.

The above description of a typical magnetic media device and the accompanying illustration of FIG. 1 are for representation purposes only. It should be apparent that magnetic media devices may contain a large number of media, or disks, and actuators, and each actuator may support a number of sliders.

Figure 2:
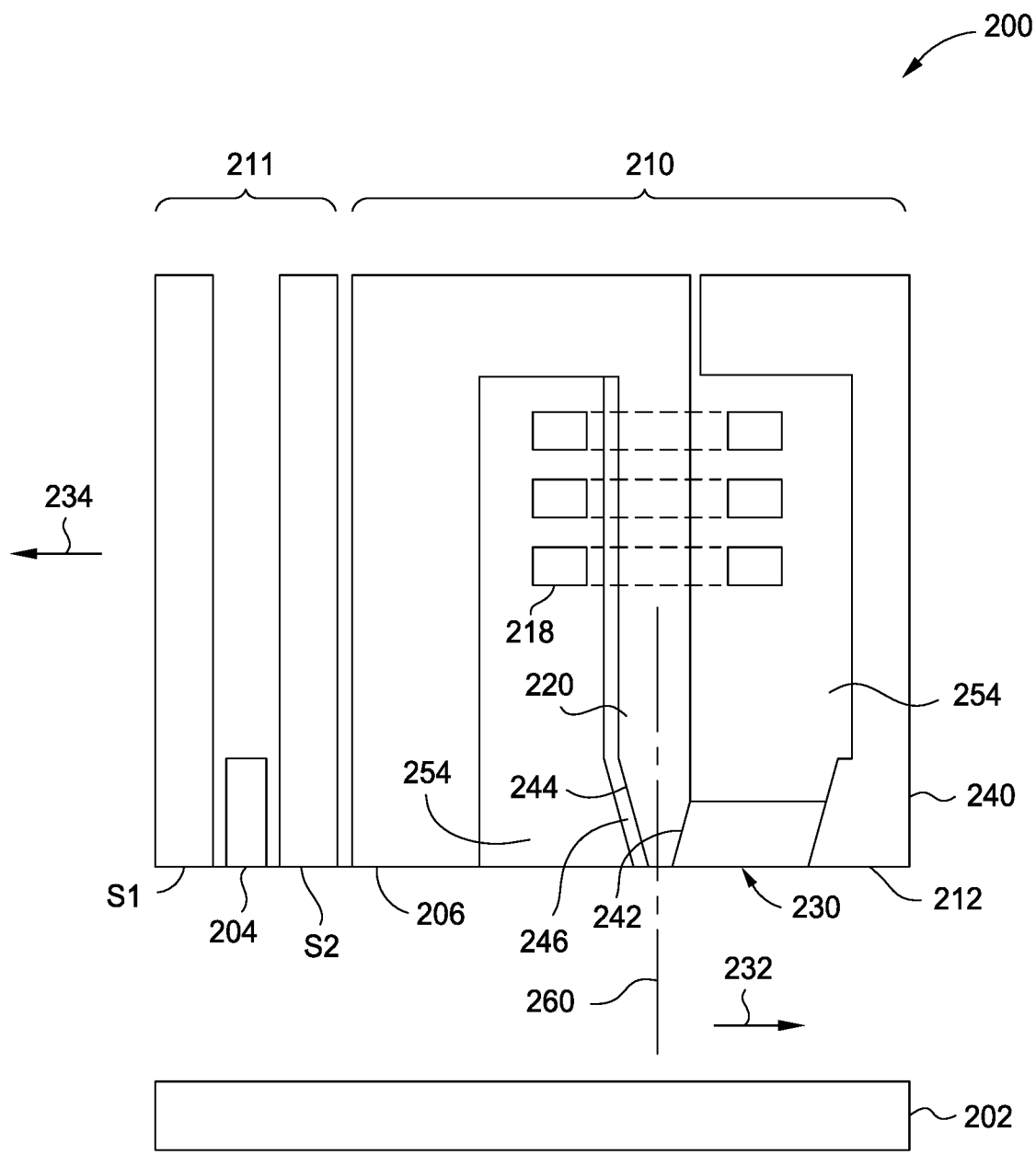
FIG. 2 is a fragmented, cross sectional side view of a magnetic read/write head facing a magnetic disk according to one embodiment.

FIG. 2 is a fragmented, cross sectional side view of a magnetic read/write head 200 facing the magnetic disk 202 according to one embodiment. The magnetic disk 202 may correspond to the magnetic disk 112 described above in regards to FIG. 1. The magnetic read/write head 200 may correspond to the magnetic head assembly 121 described above in regards to FIG. 1. The magnetic read/write head 200 includes a MFS 212, such as an air bearing surface (ABS), facing the disk 202, a magnetic write head 210, and a magnetic read head 211. As shown in FIG. 2, the magnetic disk 202 moves past the write head 210 in the direction indicated by the arrow 232 and the magnetic read/write head 200 moves in the direction indicated by the arrow 234.

In some embodiments, the magnetic read head 211 is a magnetoresistive (MR) read head that includes an MR sensing element 204 disposed between MR shields S1 and S2. In other embodiments, the magnetic read head 211 is a magnetic tunnel junction (MTJ) read head that includes a MTJ sensing device 204 disposed between MR shields S1 and S2. The magnetic fields of the adjacent magnetized regions in the magnetic disk 202 are detectable by the MR (or MTJ) sensing element 204 as the recorded bits.

The write head 210 includes a main pole 220, a leading shield 206, a trailing shield 240, a MAMR stack 230 disposed between the main pole 220 and the trailing shield 240, and a coil 218 that excites the main pole 220. The coil 218 may have a "pancake" structure which winds around a back-contact between the main pole 220 and the leading shield 206, instead of a "helical" structure shown in FIG. 2. The MAMR stack 230 is in contact with the main pole 220. In one embodiment, a non-magnetic electrically conductive structure 246 surrounds at least a portion of the main pole 220. The non-magnetic electrically conductive structure 246 surrounds a portion of the main pole 220 at the MFS 212. The non-magnetic electrically conductive structure 246 is fabricated from a non-magnetic electrically conductive metal, such as NiTa, Cr, Cu, or Rh. In some embodiments, the non-magnetic electrically conductive structure 246 is fabricated from a multi-layer stack, such as NiTa/Ru, Cr/Cu, or Cr/Rh. A structure 254 surrounds the non-magnetic electrically conductive structure 246. The structure 254 also surrounds at least a portion of the main pole 220. The definition of the term "surround" includes having an intermediate material between a first element that is surrounding a second element and the second element that is being surrounded by the first element. For example, the non-magnetic electrically conductive structure 246 is disposed between the structure 254 and at least a portion of the main pole 220.

The structure 254 is fabricated from a material that is thermally conductive and electrically insulating/dissipative. The material has a thermal conductivity of at least 50 W/(m*K) and an electrical resistivity of at least $10^5$ Ω*m. The structure 254 helps dissipate joule heating generated from either the main pole 220 or the MAMR stack 230 into surrounding area without electrical shunting, leading to reduced heating or break-down induced failures. In one embodiment, the structure 254 is fabricated from aluminum nitride (AlN), silicon carbide (SiC), beryllium oxide (BeO), gallium nitride (GaN), gallium phosphide (GaP), hexagonal boron nitride (h-BN), cubic boron nitride (c-BN), boron arsenide ($B_2As_{12}$), gamma magnesium aluminate (γ-$MgAl_2O_4$), zinc oxide (ZnO), silicon (Si), carbon (C), beryllium (Be), tungsten (W), iridium (Ir), rhodium (Rh), molybdenum (Mo), diamond like carbon (DLC), or combination thereof. In one embodiment, the structure 254 is a multi-layer structure including at least one layer of GaN, GaP, h-BN, c-BN, $B_2As_{12}$, γ-$MgAl_2O_4$, ZnO, Si, C, Be, W, Ir, Rh, Mo, or DLC, and at least one layer of aluminum oxide ($Al_2O_3$), AlN, or SiC. In addition to having good thermal conductivity, materials, such as C, Be, W, Ir, and Mo, having high melting point, such as greater than 1500 K, are less prone to thermal degradation due to diffusion or oxidation during operation. In one embodiment, the structure 254 includes at least a first layer fabricated from C, Be, W, Ir, Rh, or Mo, and at least a second layer fabricated from $Al_2O_3$, AlN, or SiC. In one embodiment, the structure 254 includes a Si layer and an $Al_2O_3$ layer. In one embodiment, the structure 254 is a single layer that is a mixture of two or more materials including GaN, GaP, h-BN, c-BN, $B_2As_{12}$, γ-$MgAl_2O_4$, ZnO, Si, DLC, $Al_2O_3$, AlN, C, Be, W, Ir, Rh, Mo, and SiC. The single layer having two or more materials may be formed by a sputtering process that co-sputters two or more targets, or other processes that are known by the skilled in the art.

The main pole 220 includes a trailing taper 242 and a leading taper 244. The trailing taper 242 extends from a location recessed from the MFS 212 to the MFS 212. The leading taper 244 extends from a location recessed from the MFS 212 to the MFS 212. The trailing taper 242 and the leading taper 244 may have the same degree of taper, and the degree of taper is measured with respect to a longitudinal axis 260 of the main pole 220. In some embodiments, the main pole 220 does not include the trailing taper 242 and the leading taper 244. Instead, the main pole 220 includes a trailing side (not shown) and a leading side (not shown), and the trailing side and the leading side are substantially parallel. The main pole 220 may be a magnetic material such as a FeCo or FeCo(N) alloy, or bct-$Fe_{16}N_2$. The leading shield 206 and the trailing shield 240 may be a magnetic material, such as NiFe alloy.

Figure 3A:
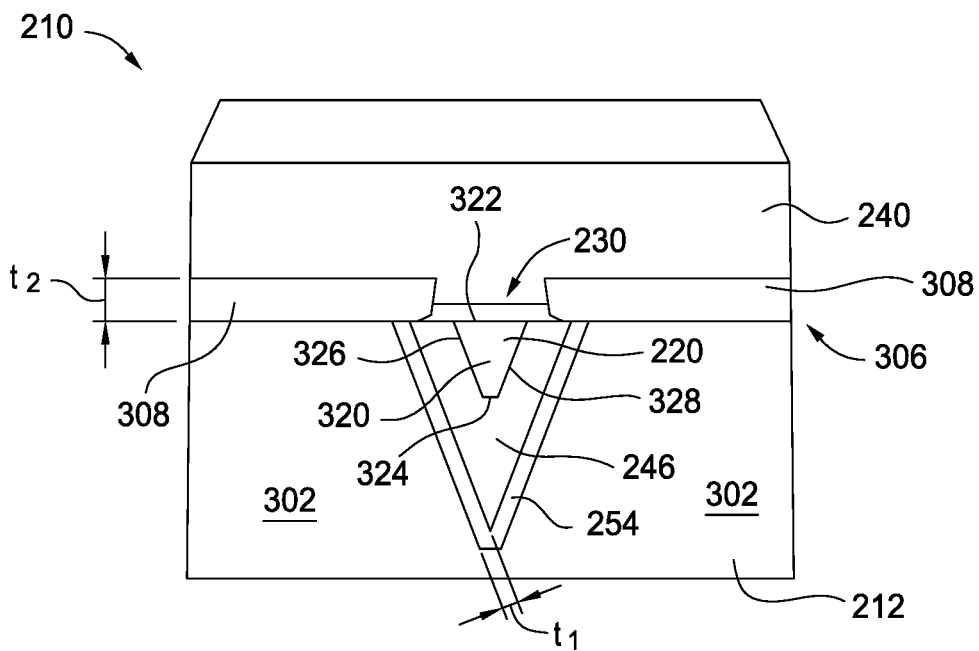
FIG. 3A is a perspective MFS view of a portion of a write head of FIG. 2 according to one embodiment.

FIG. 3A is a perspective MFS view of a portion of the write head 210 of FIG. 2 according to one embodiment. As shown in FIG. 3A, the write head 210 includes the main pole 220, the MAMR stack 230 disposed on the main pole 220, the non-magnetic electrically conductive structure 246 surrounding a portion of the main pole 220, and side shields 302 surrounding the non-magnetic electrically conductive structure 246. The main pole 220 includes a first surface 320 at the MFS 212, a second surface 322 adjacent to the first surface 320, a third surface 324 opposite the second surface 322, a fourth surface 326 connected to the second surface 322, and a fifth surface 328 opposite the fourth surface 326. In one embodiment, the non-magnetic electrically conductive structure 246 surrounds the third surface 324, the fourth surface 326, and the fifth surface 328 of the main pole 220 at the MFS 212. The structure 254 surrounds the non-magnetic electrically conductive structure 246, and the side shields surround the structure 254. The structure 254 has a thickness $t_1$ at the MFS 212. The thickness $t_1$ ranges from about 2 nm to about 80 nm. In one embodiment, the structure 254 is in contact with the side shields and the non-magnetic electrically conductive structure 246. During operation, joule heating generated in the main pole 220 gets dissipated to the side shields 302 via the non-magnetic electrically conductive structure 246 and the structure 254. Because the structure 254 is electrically resistive, electrical shunting from the main pole 220 to the side shields 302 is prevented.

The MAMR stack 230 is disposed on both the main pole 220 and the non-magnetic electrically conductive structure 246, so the electric current can flow to the MAMR stack 230 from the main pole 220 and the non-magnetic electrically conductive structure 246. A structure 306 is disposed between the trailing shield 240 and the side shields 302. In one embodiment, the structure 306 is in contact with the trailing shield 240 and the side shields 302. The structure 306 is fabricated from a material that is thermally conductive and electrically insulating/dissipative. The material has a thermal conductivity of at least 50 W/(m*K) and an electrical resistivity of at least $10^5$ Ω*m. In one embodiment, the structure 306 is fabricated from the same material as the structure 254. In one embodiment, the structure 306 is fabricated from a different material from the structure 254. The structure 306 includes first portions 308 at the MFS 212, and the MAMR stack 230 is disposed between the first portions 308 of the structure 306 at the MFS 212. Each of the first portions 308 of the structure 306 has a thickness $t_2$. The thickness $t_2$ ranges from about the same as the thickness of the MAMR stack 230 to about 1.5 times the thickness of the MAMR stack 230. The thickness $t_2$ is substantially greater than the thickness $t_1$. In one embodiment, the first portions 308 of the structure 306 are in contact with the MAMR stack 230. The first portions 308 of the structure 306 are in contact with the structure 254, as shown in FIG. 3A. In one embodiment, the first portions 308 of the structure 306 are in contact with both the structure 254 and the non-magnetic electrically conductive structure 246. During operation, joule heating generated in the MAMR stack 230 gets dissipated to the trailing shield 240 and the side shields 302 via the structure 306, the non-magnetic electrically conductive structure 246 and the structure 254. Because the structures 254, 306 are electrically resistive, electrical shunting from the main pole 220 to the side shields 302 and from the side shields 302 to the trailing shield 240 is prevented.

Figure 3B:
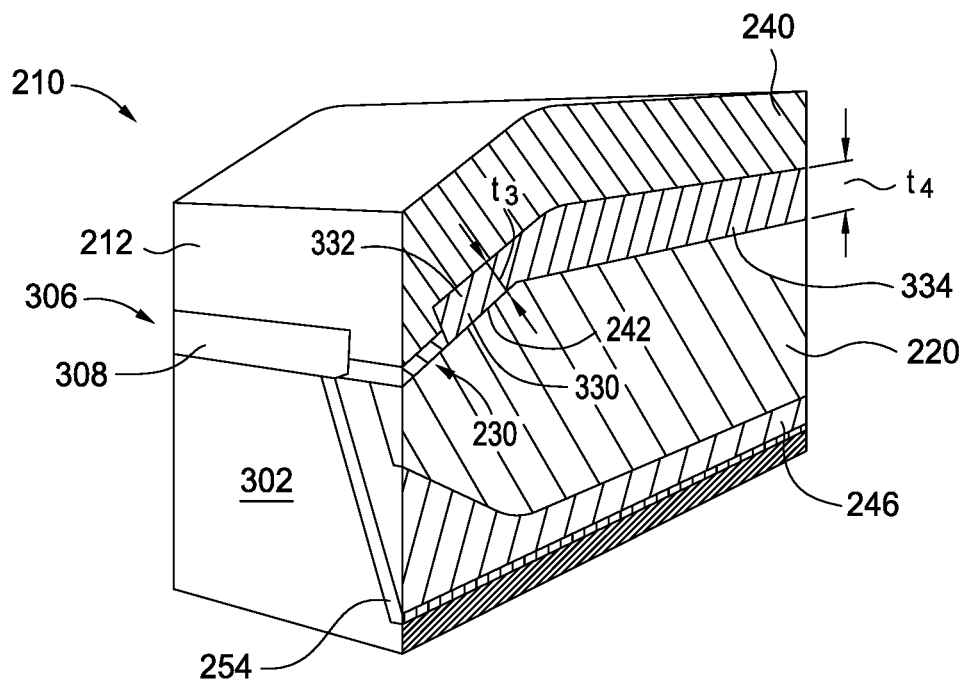
FIG. 3B is a perspective cross sectional view of the portion the write head of FIG. 3A according to one embodiment.

FIG. 3B is a perspective cross sectional view of the portion the write head 210 of FIG. 3A according to one embodiment. As shown in FIG. 3B, the first portion 308 of the structure 306 is disposed between the trailing shield 240 and the side shield 302 at the MFS 212. The structure 306 includes a second portion 330 that is recessed from the MFS 212. The second portion 330 of the structure 306 is in contact with the MAMR stack 230 at a location that is recessed from the MFS 212. The second portion 330 of the structure 306 is disposed between the trailing shield 240 and the main pole 220. In one embodiment, the second portion 330 of the structure 306 is in contact with the trailing shield 240 and the trailing taper 242 of the main pole 220. In one embodiment, the second portion 330 has a non-uniform thickness, as shown in FIG. 3B. The second portion 330 has a portion 332 disposed on the taper 242 of the main pole 220, and the portion 332 has a thickness $t_3$. The thickness $t_3$ may be substantially the same as the thickness $t_2$. The second portion 330 has a portion 334 extending from the portion 332 away from the MFS 212, and the portion 334 has a thickness $t_4$. The thickness $t_4$ is substantially equal to or greater than the thickness $t_3$. Both thicknesses $t_4$ and $t_3$ are substantially equal to or greater than the thickness $t_1$.

As shown in FIG. 3B, the non-magnetic electrically conductive structure 246 and the structure 254 both extend from the MFS 212 to a location recessed from the MFS 212. The one or more portions of the main pole 220 that are surrounded by the non-magnetic electrically conductive structure 246 and the structure 254 at the MFS 212 are also surrounded by the non-magnetic electrically conductive structure 246 and the structure 254 at locations recessed from the MFS 212.

Figure 3C:
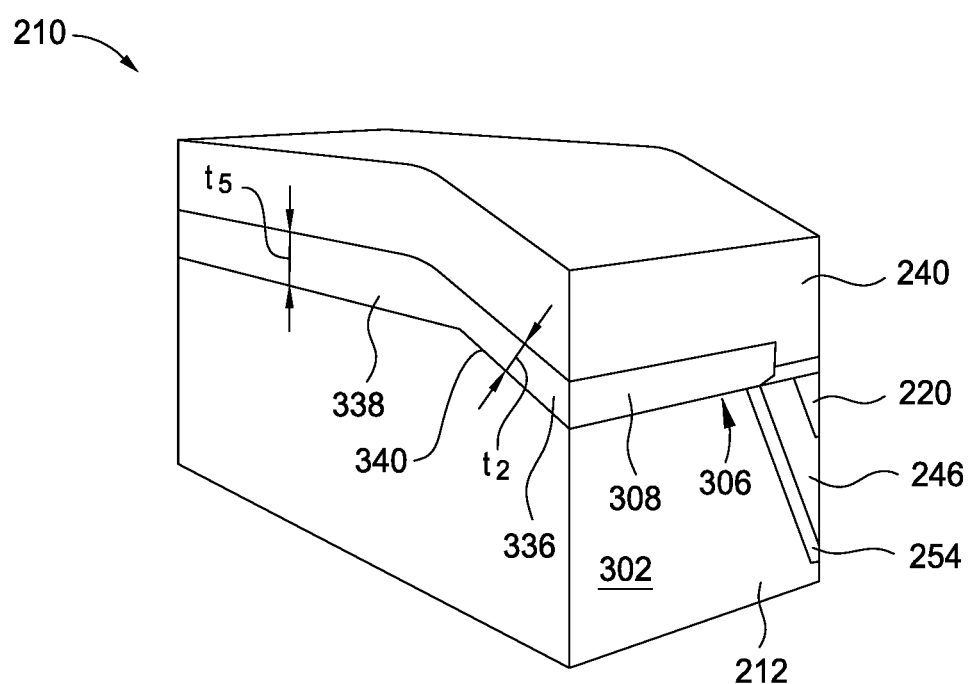
FIG. 3C is a perspective view of the portion of the write head of FIG. 3A according to one embodiment.

FIG. 3C is a perspective view of a portion of the write head 210 of FIG. 3A according to one embodiment. As shown in FIG. 3C, the first portion 308 of the structure 306 has a portion 336 disposed on a taper 340 of the side shield 302. The taper 340 may be substantially parallel to the trailing taper 242 of the main pole 220. The portion 336 has the thickness $t_2$. The first portion 308 has a portion 338 extending from the portion 336 away from the MFS 212, and the portion 338 has a thickness $t_5$. The thickness $t_5$ is substantially equal to or greater than the thickness $t_2$. Thus, similar to the second portion 330, each of the first portions 308 may have a non-uniform thickness.

Figure 3D:
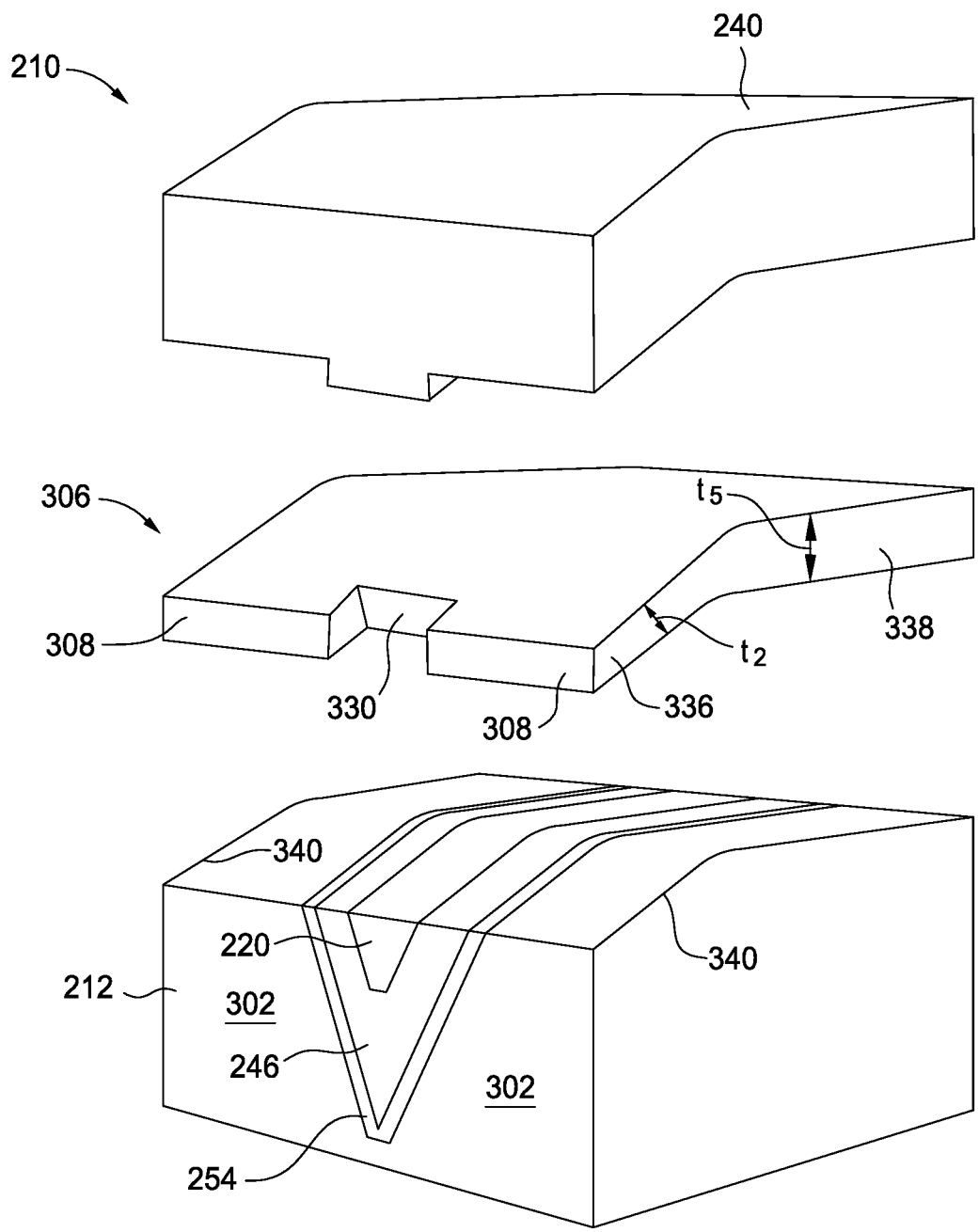
FIG. 3D is an exploded view of the portion of the write head of FIG. 3A according to one embodiment.

FIG. 3D is an exploded view of the portion of the write head 210 of FIG. 3A according to one embodiment. The MAMR stack 230 is omitted for better illustration. As shown in FIG. 3D, the write head 210 includes the trailing shield 240 disposed over the structure 306. The first portions 308 of the structure 306 are disposed at the MFS 212, and the second portion 330 is recessed from the MFS 212. The first portion 308 includes the portion 336 and the portion 338 extending from the portion 336 away from the MFS 212, and the portion 336 is disposed over the taper 340 of the side shield 302. The thickness $t_2$ of the portion 336 is substantially less than the thickness $t_5$ of the portion 338. The first portions 308 are disposed between the trailing shield 240 and the side shields 302, and the second portion 330 is disposed between the trailing shield 240 and the main pole 220. In one embodiment, the first portions 308 are in contact with the trailing shield 240 and the side shields 302, and the second portion 330 is in contact with the trailing shield 240 and the main pole 220.

Figure 4A:
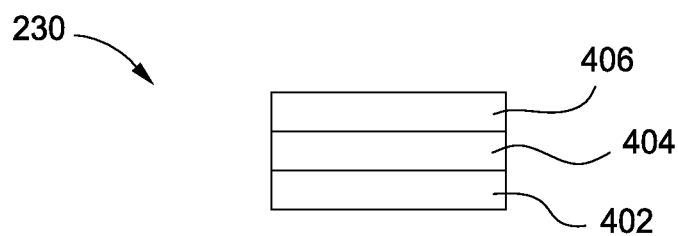
FIGS. 4A-4C are side views of a MAMR stack of FIG. 2 according to embodiments.
Figure 4B:
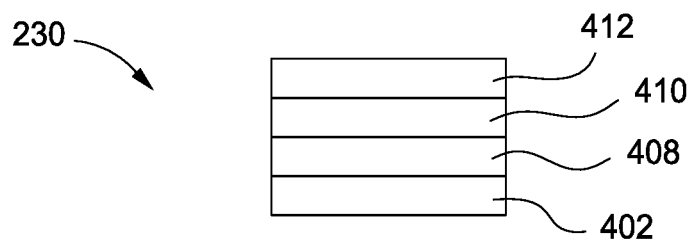
Figure 4C:
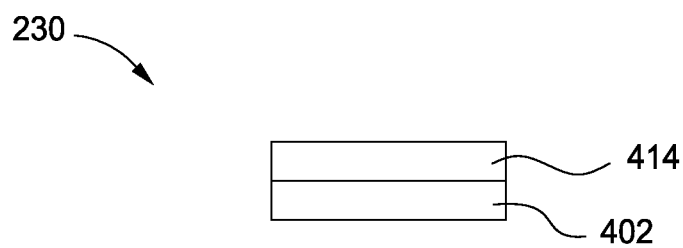

FIGS. 4A-4C are side views of the MAMR stack 230 of FIG. 2 according to embodiments. As shown in FIG. 4A, the MAMR stack 230 includes a seed layer 402, a spacer layer 404 disposed on the seed layer 402, and a magnetic layer 406 disposed on the spacer layer 404. The seed layer 402 is fabricated from an electrically conductive material, such as a non-magnetic metal. In one embodiment, the seed layer 402 is fabricated from Ta, Cr, Cu, NiAl, Ru, Rh, or combination thereof. The magnetic layer 406 is fabricated from a magnetic material, such as NiFe, CoMnGe, CoFe, or combinations thereof. In one embodiment, the magnetic layer 406 is a STL. The spacer layer 404 is fabricated from a material such as copper (Cu) or silver tin alloy (AgSn). During operation, an electrical current flows into the magnetic layer 406 via the main pole 220 and the non-magnetic electrically conductive structure 246 (FIG. 2), and the magnetic layer 406 is magnetized, leading to improved write-ability.

FIG. 4B is a side view of the MAMR stack 230 according to another embodiment. As shown in FIG. 4B, the MAMR stack 230 includes a first magnetic layer 408 disposed on the seed layer 402, an interlayer 410 disposed on the first magnetic layer 408, and a second magnetic layer 412 disposed on the interlayer 410. In one embodiment, the first magnetic layer 408 is a spin polarization layer (SPL), and the second magnetic layer 412 is a field generation layer (FGL). In another embodiment, the first magnetic layer 408 is an FGL, and the second magnetic layer 412 is a SPL. The SPL may be a CoNi layer having perpendicular magnetic anisotropy. Other materials may be used as the SPL, such as CoMnGe, CoFe, NiFe, CoPt, CoCrPt, CoPd, FePt, CoFePd, TbFeCo, or combinations thereof. The FGL may be a CoFe layer or lamination of Co and Fe layers. The interlayer 410 may be a metal layer having long spin diffusion length such as Au, Ag, AgSn, or Cu. The first magnetic layer 408, the interlayer 410, and the second magnetic layer 412 may form a STO. During operation, an electrical current flows into the STO via the main pole 220 and the non-magnetic electrically conductive structure 246 (FIG. 2), and the STO oscillates and provides an AC magnetic field to the recording medium. The AC magnetic field may reduce the coercive force of the recording medium, thus high quality recording by MAMR may be achieved.

FIG. 4C is a side view of the MAMR stack 230 according to yet another embodiment. As shown in FIG. 4C, the MAMR stack 230 includes the seed layer 402 and a non-magnetic gap layer 414 disposed on the seed layer 402. The non-magnetic gap layer 414 is fabricated from a non-magnetic metal, such as Cu, Cr, Ta, Ru, W, Au, Ag, Sn, Mo, Ir, Pt, or Rh. During operation, an electrical current flows into the non-magnetic gap layer 414 via the main pole 220 and the non-magnetic electrically conductive structure 246 (FIG. 2), and write-ability is improved.

The data storage device including the magnetic write head having a heat dissipating structure surrounding at least a portion of the main pole and another heat dissipating structure in contact with the MAMR stack. The heat dissipating structures are both electrically insulating/dissipative. Joule heating generated in the main pole and the MAMR stack is dissipated by the structures. As a result, the write-ability of the magnetic write head is improved, and the life-time of the magnetic write head is increased because failures induced by heating or break-down are minimized.

While the foregoing is directed to embodiments of the present disclosure, other and further embodiments of the disclosure may be devised without departing from the basic scope thereof, and the scope thereof is determined by the claims that follow.

The invention claimed is:

1. A magnetic recording head, comprising:
 a trailing shield;
 a main pole;
 side shields surrounding at least a portion of the main pole;
 a stack disposed between the main pole and the trailing shield;
 a first structure surrounding at least a portion of the main pole at a media facing surface, wherein the first structure is fabricated from a material having a thermal conductivity of at least 50 W/(m*K) and an electrical resistivity of at least $10^5$ $\Omega$*m;
 a non-magnetic electrically conductive structure disposed between the main pole and the first structure; and
 a second structure having first portions and a second portion, wherein the first portions of the second structure are disposed between the trailing shield and the side shields, and the second portion of the second structure is disposed between the trailing shield and the main pole at a location recessed from the media facing surface.

2. The magnetic recording head of claim 1, wherein the main pole has a first surface at the media facing surface, a second surface adjacent to the first surface, a third surface opposite the second surface, a fourth surface connected to the second surface, and a fifth surface opposite the fourth surface.

3. The magnetic recording head of claim 2, wherein the first structure surrounds the third surface, the fourth surface, and the fifth surface of the main pole.

4. The magnetic recording head of claim 1, wherein the non-magnetic electrically conductive structure comprises NiTa, Cr, Cu, Rh, or combination thereof.

5. The magnetic recording head of claim 1, wherein the first structure is disposed between the side shields and the non-magnetic electrically conductive structure.

6. The magnetic recording head of claim 1, wherein the second structure is fabricated from a material having a thermal conductivity of at least 50 W/(m*K) and an electrical resistivity of at least $10^5$ $\Omega$*m.

7. A data storage device comprising the magnetic recording head of claim 1.

8. The magnetic recording head of claim 1, wherein the first structure is in contact with the first portions of the second structure, and wherein the second portion of the second structure contacts the stack at a location recessed from the media facing surface.

9. The magnetic recording head of claim 1, wherein the first structure has a first thickness less than a second thickness of the second structure, and wherein the second thickness of the second structure is about the same as or greater than a third thickness of the stack.

10. The magnetic recording head of claim 1, wherein the stack comprises a seed layer, a spacer layer disposed on the seed layer, and a magnetic layer disposed on the spacer layer.

11. The magnetic recording head of claim 10, wherein the magnetic layer is a spin torque layer.

12. The magnetic recording head of claim 10, wherein the magnetic layer comprises NiFe, CoMnGe, CoFe, or a combination thereof, wherein the seed layer comprises Ta, Cr, Cu, NiAl, Ru, Rh, or a combination thereof, and wherein the spacer layer comprises Cu or AgSn.

13. A magnetic recording head, comprising:
a trailing shield;
a main pole;
a stack disposed between the main pole and the trailing shield; and
means for dissipating heat generated from the main pole or the stack without electrical shunting, wherein the means for dissipating heat surrounds at least a portion of the main pole at a media facing surface.

14. The magnetic recording head of claim 13, wherein the stack comprises a seed layer, a first magnetic layer disposed on the seed layer, a second magnetic layer, and an interlayer disposed between the first magnetic layer and the second magnetic layer.

15. The magnetic recording head of claim 13, wherein the stack comprises a seed layer and a non-magnetic gap layer disposed on the seed layer.

16. A data storage device comprising the magnetic recording head of claim 13.

17. The magnetic recording head of claim 13, wherein the stack comprises a seed layer, a spacer layer disposed on the seed layer, and a magnetic layer disposed on the spacer layer.

18. The magnetic recording head of claim 17, wherein the magnetic layer is a spin torque layer.

19. The magnetic recording head of claim 17, wherein the magnetic layer comprises NiFe, CoMnGe, CoFe, or a combination thereof.

20. The magnetic recording head of claim 17, wherein the seed layer comprises Ta, Cr, Cu, NiAl, Ru, Rh, or a combination thereof, and wherein the spacer layer comprises Cu or AgSn.

21. A magnetic recording head, comprising:
a trailing shield;
a main pole;
side shields disposed below the trailing shield and adjacent to the main pole;
a stack disposed between the main pole and the trailing shield;
a first structure surrounding at least a portion of the main pole at a media facing surface, wherein the first structure is fabricated from a first material having a thermal conductivity of at least 50 W/(m*K) and an electrical resistivity of at least $10^5$ $\Omega$*m; and
a second structure comprising first portions disposed between the trailing shield and the side shields, wherein the second structure is fabricated from a second material having a thermal conductivity of at least 50 W/(m*K) and an electrical resistivity of at least $10^5$ $\Omega$*m, and wherein the stack is further disposed between the first portions of the second structure at the media facing surface.

22. The magnetic recording head of claim 21, wherein the main pole has a first surface at the media facing surface, a second surface adjacent to the first surface, a third surface opposite the second surface, a fourth surface connected to the second surface, and a fifth surface opposite the fourth surface, and wherein the first structure surrounds the third surface, the fourth surface, and the fifth surface of the main pole.

23. The magnetic recording head of claim 21, further comprising a non-magnetic electrically conductive structure disposed between the main pole and the first structure, and wherein the non-magnetic electrically conductive structure comprises NiTa, Cr, Cu, Rh, or combination thereof.

24. The magnetic recording head of claim 23, wherein the first structure is disposed between the side shields and the non-magnetic electrically conductive structure, and wherein the first structure is in contact with the first portions of the second structure.

25. The magnetic recording head of claim 21, wherein the second structure further comprises a second portion recessed from the media facing surface, the second portion being disposed between the trailing shield and the main pole.

26. The magnetic recording head of claim 25, wherein the second portion of the second structure contacts the stack at a location recessed from the media facing surface.

27. The magnetic recording head of claim 21, wherein the first structure has a first thickness less than a second thickness of the second structure.

28. The magnetic recording head of claim 21, wherein a second thickness of the second structure is about the same as or about 1.5 times greater than a third thickness of the stack.

29. The magnetic recording head of claim 21, wherein the first material of the first structure is the same as the second material of the second structure.

30. A data storage device comprising the magnetic recording head of claim 21.

\* \* \* \* \*